(12) United States Patent
Booher et al.

(10) Patent No.: US 10,960,942 B2
(45) Date of Patent: Mar. 30, 2021

(54) PLATFORM TRAILER WITH REINFORCED NECK

(71) Applicant: EAST MANUFACTURING CORPORATION, Randolph, OH (US)

(72) Inventors: Howard D. Booher, Atwater, OH (US); Derek Davies, Louisville, OH (US)

(73) Assignee: East Manufacturing Corporation, Randolph, OH (US)

( * ) Notice: Subject to any disclaimer, the term of this patent is extended or adjusted under 35 U.S.C. 154(b) by 0 days.

(21) Appl. No.: 16/269,113

(22) Filed: Feb. 6, 2019

(65) Prior Publication Data

US 2019/0168828 A1    Jun. 6, 2019

Related U.S. Application Data

(63) Continuation of application No. 15/598,926, filed on May 18, 2017, now Pat. No. 10,202,153, which is a continuation of application No. 14/453,202, filed on Aug. 6, 2014, now Pat. No. 9,656,701.

(60) Provisional application No. 61/863,395, filed on Aug. 7, 2013.

(51) Int. Cl.
   *B62D 53/06*   (2006.01)
   *B62D 21/20*   (2006.01)

(52) U.S. Cl.
   CPC .......... *B62D 53/061* (2013.01); *B62D 21/20* (2013.01)

(58) Field of Classification Search
   CPC .............................. B62D 53/061; B62D 21/20
   USPC ..................................................... 280/423.1
   See application file for complete search history.

(56) References Cited

U.S. PATENT DOCUMENTS

| | | |
|---|---|---|
| 2,417,640 A | 3/1947 | Fischbach |
| 2,622,895 A | 12/1952 | Larsen |
| 2,812,192 A | 11/1957 | Cole |
| 3,580,611 A | 5/1971 | McNitt |
| 3,598,421 A | 8/1971 | Mason, Jr. |
| 3,705,732 A | 12/1972 | Marinelli |

(Continued)

FOREIGN PATENT DOCUMENTS

EP    1 595 773    11/2005

OTHER PUBLICATIONS

International Search Report dated May 9, 2013 for International application No. PCT/US2013/028777.

(Continued)

*Primary Examiner* — Jacob D Knutson
(74) *Attorney, Agent, or Firm* — Fay Sharpe LLP

(57) ABSTRACT

A trailer neck reinforcement structure includes a first beam reinforcement structure that includes: (i) a first beam inner insert connected to an inner side of the first beam; and, (ii) and a first beam outer insert connected to an outer side of the first beam. A second beam reinforcement structure includes: (i) a second beam inner insert connected to an inner side of the second beam; and, (ii) and a second beam outer insert connected to an outer side of the second beam. Internal cross members extend between the first beam inner insert and the second beam inner insert. A first group of external cross members are located between the first beam outer insert and the left side rail, and a second group of external cross members are located between the second beam outer insert and the right side rail. Each external cross member comprises an inner segment connected to an outer segment.

19 Claims, 12 Drawing Sheets

(56) References Cited

U.S. PATENT DOCUMENTS

| | | |
|---|---|---|
| 3,759,547 A | 9/1973 | Ankeny |
| 3,909,059 A | 9/1975 | Benninger et al. |
| 3,990,720 A | 11/1976 | Schwartz |
| 4,226,465 A | 10/1980 | McCullough |
| 4,288,957 A | 9/1981 | Meehan |
| 4,564,233 A | 1/1986 | Booher |
| 4,758,128 A | 7/1988 | Law |
| 4,787,669 A | 11/1988 | Wante |
| 4,806,065 A | 2/1989 | Holt et al. |
| 4,863,189 A | 9/1989 | Lindsay |
| 4,938,524 A * | 7/1990 | Straub .................... B61D 17/10 280/423.1 |
| 5,210,921 A | 5/1993 | Booher |
| 5,242,185 A | 9/1993 | Carr et al. |
| 5,322,314 A | 6/1994 | Blum |
| 5,417,453 A | 5/1995 | VanDenberg |
| 5,474,331 A | 12/1995 | Booher |
| H1587 H | 9/1996 | Van Valkenburgh et al. |
| 5,744,197 A | 4/1998 | Van Eck |
| 6,109,684 A * | 8/2000 | Reitnouer .............. B62D 33/02 280/795 |
| 6,254,132 B1 | 7/2001 | Lindsay |
| 6,729,816 B2 | 5/2004 | Booher |
| 7,156,422 B2 | 1/2007 | Verhaeghe |
| 7,181,889 B2 | 2/2007 | Perkowski |
| 7,264,305 B2 | 9/2007 | Kuriakose |
| 7,287,780 B2 | 10/2007 | Reese et al. |
| 7,571,953 B2 | 8/2009 | Adams |
| 7,677,625 B2 | 3/2010 | Gosselin et al. |
| 7,770,928 B2 | 8/2010 | Booher |
| 7,798,558 B2 | 9/2010 | Messier |
| 8,215,240 B2 | 7/2012 | Graaff et al. |
| 8,562,022 B2 | 10/2013 | Nadeau et al. |
| 9,533,721 B2 | 1/2017 | Booher et al. |
| 9,656,701 B2 * | 5/2017 | Booher .................. B62D 21/20 |
| 10,202,153 B2 * | 2/2019 | Booher .................. B62D 21/20 |
| 2006/0071506 A1 | 4/2006 | Adams |
| 2007/0069500 A1 * | 3/2007 | Bloodworth ....... B62D 53/0842 280/433 |
| 2008/0211218 A1 * | 9/2008 | Booher .................. B62D 21/20 280/789 |
| 2009/0160163 A1 * | 6/2009 | Gosselin .............. B62D 53/068 280/656 |
| 2010/0199879 A1 | 8/2010 | Graaff et al. |
| 2012/0086185 A1 | 4/2012 | Kerr et al. |
| 2012/0104796 A1 | 5/2012 | Balaz et al. |
| 2014/0001731 A1 | 1/2014 | Booher et al. |

OTHER PUBLICATIONS

Written Opinion dated May 9, 2013 for International application No. PCT/US2013/028777.

International Preliminary Report on Patentability dated May 12, 2015 for International application No. PCT/US2013/028777.

Letter regarding Co-Pending U.S. Appl. No. 15/388,710, filed Dec. 22, 2016.

* cited by examiner

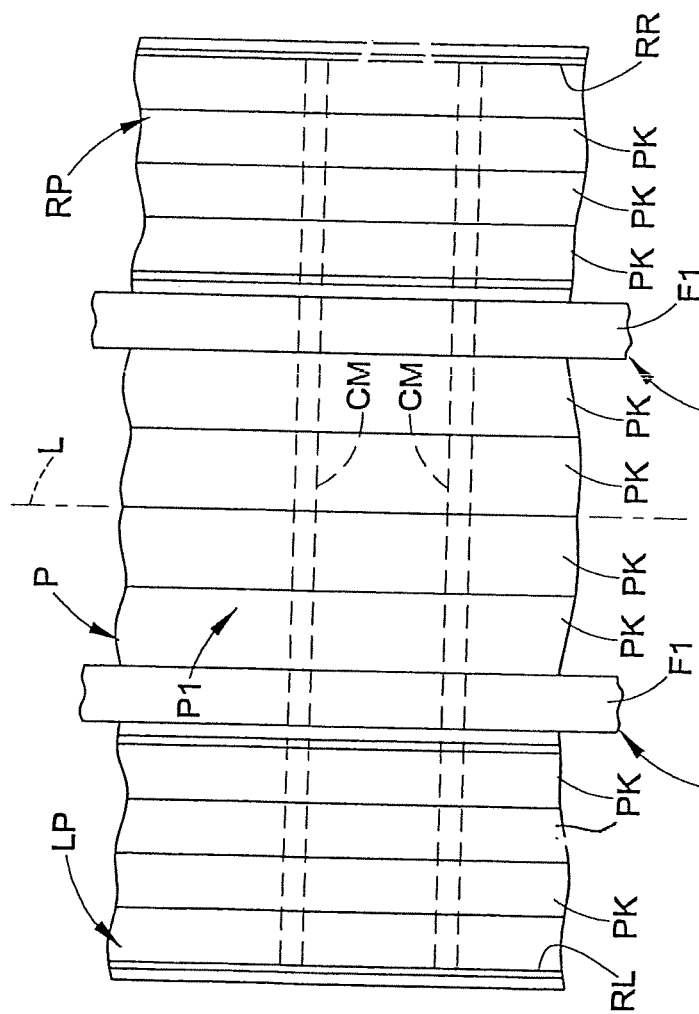
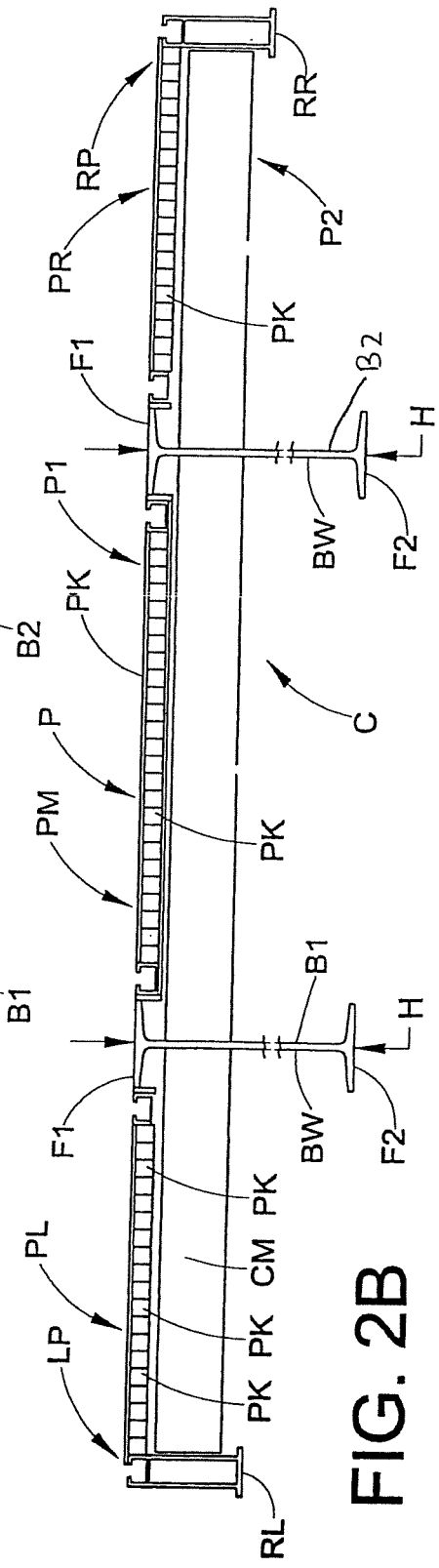
FIG. 2A
FIG. 2B

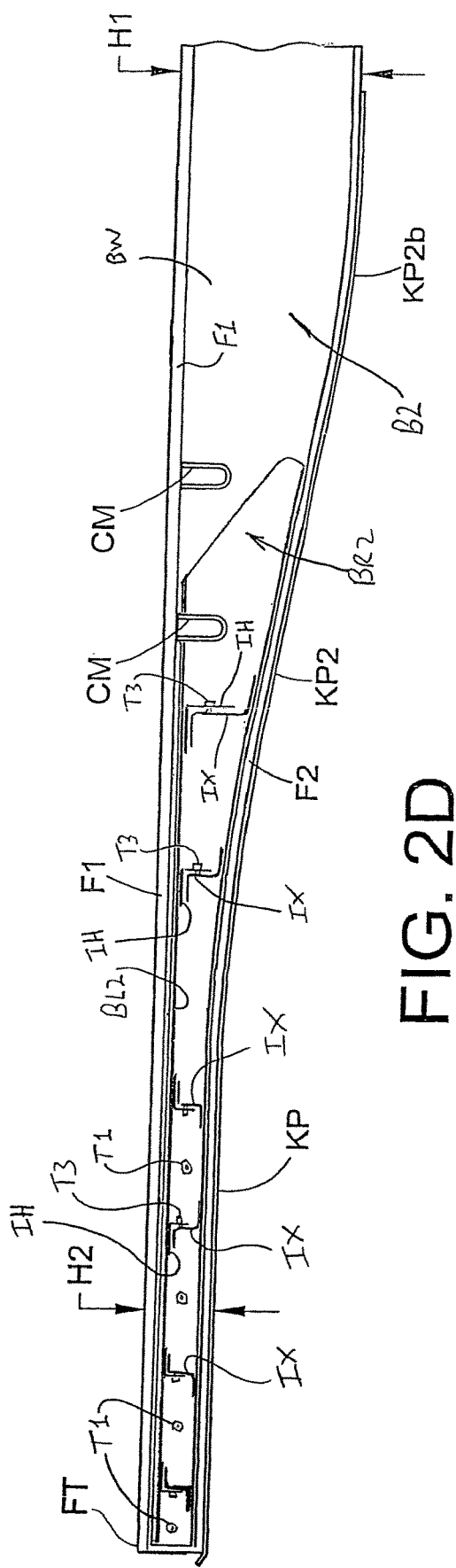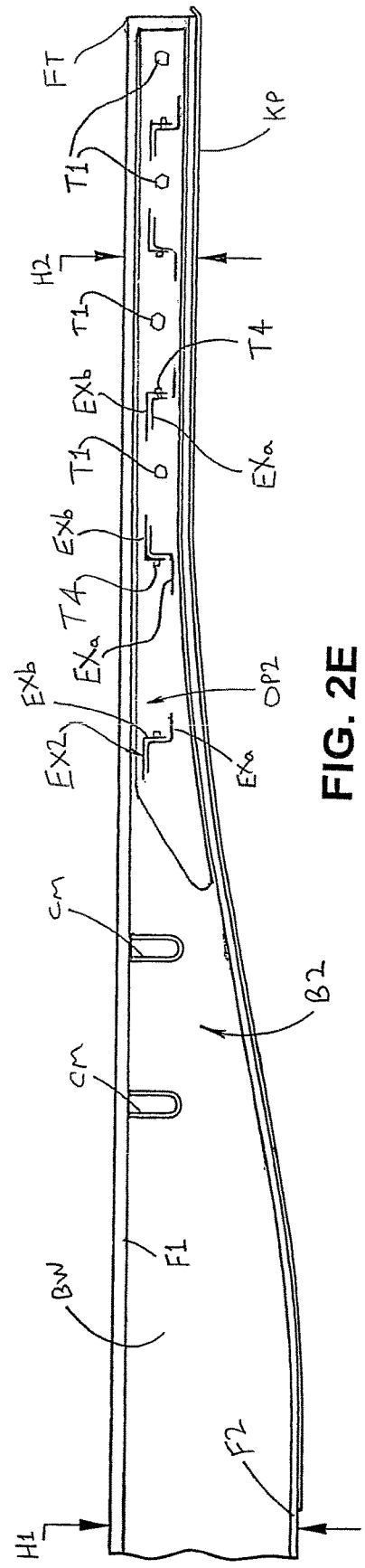
FIG. 2D
FIG. 2E

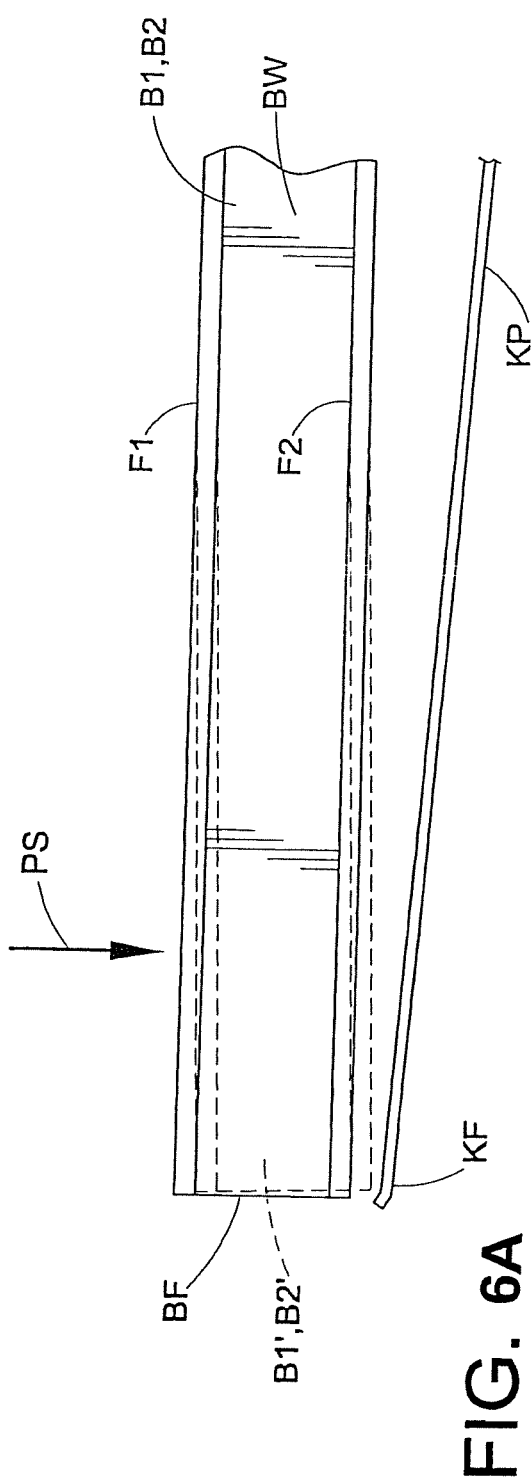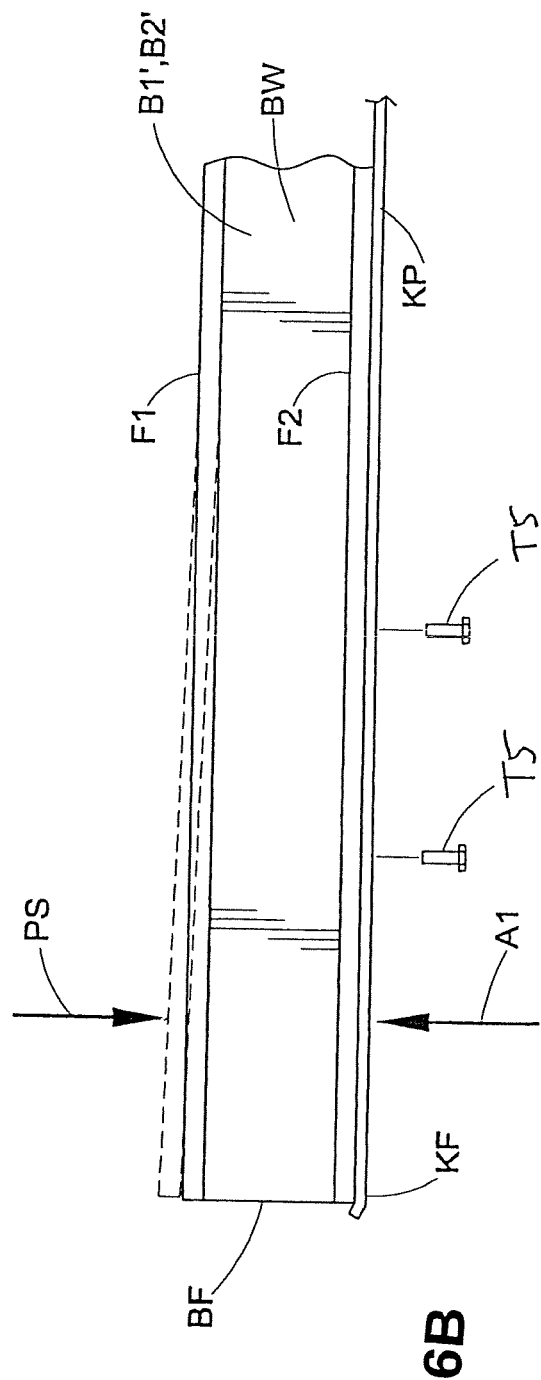

PLATFORM TRAILER WITH REINFORCED NECK

CROSS-REFERENCE TO RELATED APPLICATIONS

This application is a continuation of U.S. application Ser. No. 15/598,926 filed May 18, 2017 (May 18, 2017), now assigned U.S. Pat. No. 10,202,153, which is a continuation of U.S. application Ser. No. 14/453,202 filed Aug. 6, 2014 (Aug. 6, 2014), now assigned U.S. Pat. No. 9,656,701, which claims priority from and benefit of the filing date of U.S. provisional application Ser. No. 61/863,395 filed Aug. 7, 2013 (Aug. 7, 2013), and the entire disclosure of each of said prior applications is hereby expressly incorporated by reference into the present specification.

BACKGROUND

Platform or "flatbed" trailers manufactured using main beams defined from aluminum alloy are becoming increasingly popular as compared to those manufactured using main beams defined from steel. These platform trailers manufactured using aluminum beams have traditionally been manufactured using beams that have a height in the neck region of the trailer that is greater than desired in order to provide the neck region of the trailer with sufficient strength. The height of these aluminum beams in the neck region of known trailers negatively impacts the cargo carrying capacity of the trailer by reducing the height of the load that can be transported on the trailer while keeping the overall height of the load below the maximum height required by law and/or by bridges, overpasses, or like structures under which the trailer and load must pass. This reduction in load height negatively impacts the ability to use aluminum beam platform trailers including "curtainside" or other canopy structures, because the height of the canopy structure must be reduced correspondingly with the increase in beam height in the neck region to ensure that the canopy structure does not have an overall height greater than legal or other limits, which constrains the amount of cargo that can be hauled inside a curtainside or other canopied platform trailer manufactured using aluminum beams. Trailers manufactured using steel beams instead of aluminum have reduced the height of the beams in the neck region, but the steel beams are susceptible to corrosion and add to the empty weight of the trailer which decreases load capacity and increases fuel consumption.

In light of the foregoing, a need has been identified for a platform trailer manufactured using aluminum beams that have a substantially reduced height in the neck region, while still having sufficient strength for the trailer to carry coils of steel and other heavy and concentrated loads.

SUMMARY

In accordance with one aspect of the present development, a platform trailer includes a forward end and a rear end spaced apart from each other along a longitudinal axis. A cargo supporting platform extends between the forward end and the rear end and includes left and right laterally spaced-apart sides. A chassis supports the platform and includes first and second beams that extend parallel to the longitudinal axis. The first and second beams each define a first height H1 located axially between the forward end and the rear end. At least one axle assembly is connected to the chassis between a midpoint of the trailer and the rear end and includes left and right rotatable wheel and tire assemblies. The midpoint is located halfway between the forward end and the rear end. The trailer includes a neck region adjacent the forward end where the first and second beams each define a second height H2 that is less than the first height H1. A fifth wheel plate is fixedly secured to and extends between both the first and second beams in the neck region. A kingpin is connected to the fifth wheel plate and is adapted to be engaged by an associated tractor fifth wheel. The trailer further includes a neck reinforcement structure located in the neck region. The neck reinforcement structure includes a first beam reinforcement structure connected to the first beam. The first beam reinforcement structure includes: (i) a first beam inner insert connected to an inner side of the first beam that faces the second beam; and, (ii) and a first beam outer insert connected to an outer side of the first beam that is oriented away from the second beam. The neck reinforcement structure also includes a second beam reinforcement structure connected to the second beam. The second beam reinforcement structure includes: (i) a second beam inner insert connected to an inner side of the second beam that faces the first beam; and, (ii) and a second beam outer insert connected to an outer side of the second beam that is oriented away from the first beam. A plurality of internal cross members extend between and interconnect the first beam inner insert and the second beam inner insert. A first group of external cross members are located between the first beam outer insert and the left side rail, and a second group of external cross members are located between the second beam outer insert and the right side rail. Each external cross member comprises an inner segment connected to an outer segment, said inner and outer segments of each external cross member of the first group connected respectively to the first beam outer insert and the left side rail, and the inner and outer segments of each external cross member of the second group connected respectively to the second beam outer insert and the right side rail.

BRIEF DESCRIPTION OF DRAWINGS

FIG. 2A is a partial plan view of the trailer as taken at line A-A of FIG. 1A;

FIG. 2B is a section view of the trailer of FIG. 1A as taken at line B-B of FIG. 1A.

FIG. 2D is a simplified partial section view taken at line D-D of FIG. 2C;

FIG. 2E is a simplified partial section view taken at line E-E of FIG. 2C;

FIGS. 6A and 6B illustrate a method of installing the fifth wheel plate of FIG. 4 as part of the reinforced neck structure RS;

DETAILED DESCRIPTION

Figure 1A:
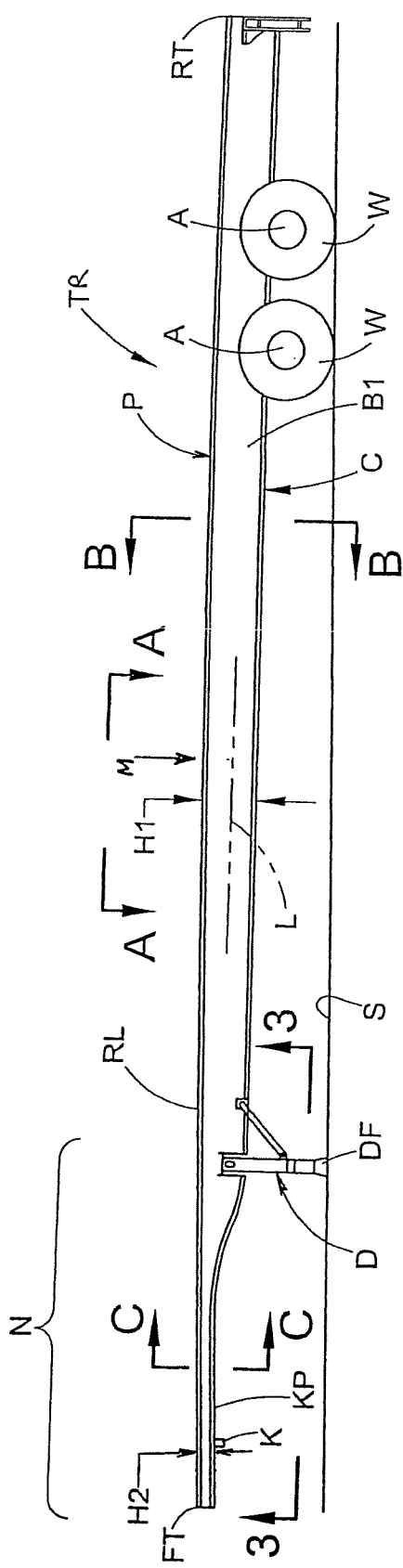
FIGS. 1A and 1B are left (driver side) and right (passenger side) elevation views, respectively, of a platform semi-trailer with a reinforced neck formed in accordance with the present development.
Figure 1B:
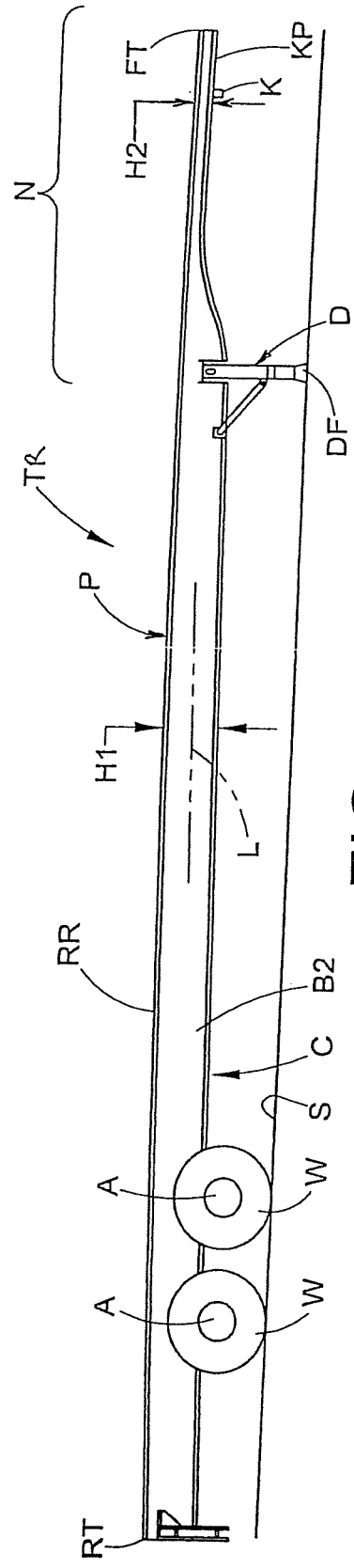

FIGS. 1A and 1B are left (driver side) and right (passenger side) elevation views, respectively, of a platform or "flatbed" semi-trailer TR formed in accordance with the present development. The trailer TR is adapted to be connected to and pulled by a tractor/truck (not shown). The trailer TR comprises a forward edge or forward end FT and a rear edge or end RT spaced-apart from each other on a longitudinal axis L.

Referring to FIGS. 1A-2B, it can be seen that the trailer TR further comprises a cargo-supporting platform P including left and right laterally spaced-apart sides LP,RP. The forward edge or forward end FT of the trailer TR and the rear edge or rear end RT of the trailer are defined by the opposite ends of the cargo-supporting platform P spaced a maximum distance from each other along the longitudinal axis L. The platform P is supported by and connected to a frame or chassis C that includes first (left) and second (right) spaced-apart main beams B1,B2 that extend parallel to each other and to the longitudinal axis L from the forward end FT to the rear end RT. Each beam B1,B2 defines an I-beam profile comprising an upper flange F1 and a lower flange F2 (FIG. 2B) connected by a vertical beam web BW. The beams B1,B2 are aluminum alloy (sometimes referred to herein simply as "aluminum") beams that are fabricated by welding or otherwise, e.g., by abutting and welding together or otherwise connecting two separate T-shaped aluminum alloy extrusions. A suitable aluminum alloy for the beams is 6061-T6, although other suitable aluminum alloys can be used without departing from the present development. The beams B1,B2 are preferably prearched, i.e., manufactured such that at least the upper flange F1 has an arched configuration during fabrication, with the apex of the arch being oriented upward and located along the upper flange F1 generally near a midpoint M along the longitudinal axis L of the trailer or otherwise located between the forward end FT and rear end RT of the trailer. The axial midpoint M is located halfway between the forward end FT and the rear end RT of the trailer, i.e., the midpoint M is located half the maximum distance between the most forward edge of the forward end FT and the most rearward edge of the rear end RT of the trailer T.

A kingpin K is located at the forward end FT of the trailer TR, centrally located laterally between and connected to the beams B1,B2 by a fifth-wheel plate KP, and is adapted to be engaged by a fifth-wheel of an associated tractor/truck for towing the trailer TR. The rear end RT of the trailer includes at least one and typically at least two axle assemblies A connected to the chassis, e.g., to the lower flanges F2 of beams B1,B2. Each axle assembly A comprises at least one left and at least one right rotatable wheel and tire assemblies W for movably supporting the trailer TR on a road or other surface S. The trailer TR further comprises a dolly assembly D, typically located axially between the kingpin K and an axial midpoint of the trailer TR. The dolly assembly D includes support feet DF that are selectively lowered to support the forward end FT of the trailer TR when the kingpin is not connected to an associated tractor/truck (the dolly assembly D is shown only in FIGS. 1A & 1B for clarity).

The platform P comprises left and right side rails RL,RR that delimit the opposite lateral sides LP,RP of the platform, respectively. These side rails RL,RR are each typically defined as one-piece/monolithic extrusions of aluminum alloy (such as the same material used for the beams B1,B2) having a profile such as that shown in FIG. 2B and that extend in one piece from the forward end FT to the rear end RT of the trailer TR parallel to the beams B1,B2 and the longitudinal axis L (the profiles of the side rails RL,RR are typically mirror images of each other as shown herein). The side rails RL,RR are arched similarly to the beams as shown in FIGS. 1A and 1B with an apex of the arch oriented upward and located between the forward and rear ends FT,RT.

The platform P, itself, comprises a plurality of wood and/or metal longitudinally extending platform members PK, each of which extends longitudinally from the forward end FT to the rear end RT of the trailer, as one-piece or otherwise to define an upper cargo-supporting surface P1. Typically, the platform members PK comprise aluminum extrusions and/or wooden planks or the like. Regardless of the material used to define the platform members PK, it should be noted that they are shown as extending longitudinally between the forward and rear trailer ends FT,RT, but can alternatively extend laterally or transversely between the left and right side rails RL,RR. In the illustrated trailer embodiment, the upper flange F1 of each beam B1,B2 also defines part of the upper/outer surface of the platform P and is arranged to lie substantially flush with the platform members PK located on its opposite lateral sides as is readily apparent in FIG. 2B. Because of its arched shape, the platform P is highest above the support surface S between the front and rear trailer ends FT,RT, with the front and rear ends FT,RT being located closer to the road or other support surface S on which the trailer TR is positioned as compared to the central portion of the platform P.

To support the longitudinally extending platform members PK, the platform P further comprises a plurality of transversely extending cross members CM (FIGS. 2A & 2B) located beneath the platform members PK at axially spaced intervals along the entire length of the trailer. The cross members CM are welded or otherwise connected to and extend perpendicularly between the left and right side rails RL,RR, passing through the web BW of the beams B1,B2 (in some cases the cross members CM comprise three separate cross member sections or "stubs" located respectively beneath and supporting the left, middle and right platform sections and abutted with the beams B1 and/or B2 instead of a single member that passes through both of the beams B1,B2). These cross members CM can have a variety of shapes, e.g., I-beam, U-shaped, C-shaped, etc. and are defined from aluminum extrusions or the like.

The forward region of the trailer TR where the kingpin K is located is referred to as the neck or neck region N, due to the fact that the beams B1,B2 are reduced in overall height in this region to accommodate the mating connection of a truck/tractor with the kingpin K (beam height H is measured as the maximum distance between the outer surface of each flange F1,F2 when measured parallel to the beam web BW as shown in FIG. 2B). For ease of reference herein, the neck region N is defined in one example as beginning adjacent the dolly assembly D, at a point where the height H of the beams B1,B2 begins to decrease from a maximum height and continues forward from such point where the height H of the beams B1,B2 begins to decrease and extends to the forward edge of the trailer TR. As shown in FIG. 1A, the beams B1,B2 define a full or maximum first height H1 at a primary load carrying location axially between the dolly assembly D and the wheel and tire assemblies W, and the beams B1,B2 define a reduced or second height H2 in the neck region N (as measured at the axial location of the kingpin K), wherein H2<H1. According to the present development, H2≤0.3*H1. In one such example, H1=21 inches or more and H2=6 inches or less. It is most preferred that H2≤0.25*H1, e.g., where H1=23.5 inches or more and H2=5.5 inches or less such that H2≤0.234*H1. For all embodiments disclosed herein, it is not intended that the first height H1 and/or the second height H2 be limited to any particular dimensions unless specifically recited in the claims. A trailer TR formed according to the present development comprises a reinforced neck N that counteracts the effects of reducing the beam height H2 in the neck region N to a value H2 that is less than 30% or even less than 25% of the first (maximum) beam height H1. The reduced beam height H2 in the neck region N increases the cargo capacity of the trailer TR, especially if a curtain side cover or other cover is connected to the trailer that must have a maximum vertical height below a certain allowable limit (e.g., 13 feet, 6 inches), i.e., given a maximum allowed overall trailer height, a lower beam height H2 in the neck region N will allow for a corresponding increase in the height of any curtain side structure or other enclosure connected to the trailer TR which will correspondingly increase the cargo capacity of the trailer TR. Based upon known tractor fifth wheels being located 46 inches above the road support surface S, a beam height H2 in the neck region N of 5.5 inches will place the upper surface of the platform P at the kingpin K at a maximum of 52 inches accounting for the presence of the fifth-wheel plate KP which is typically ¼ inch thickness.

Figure 7:
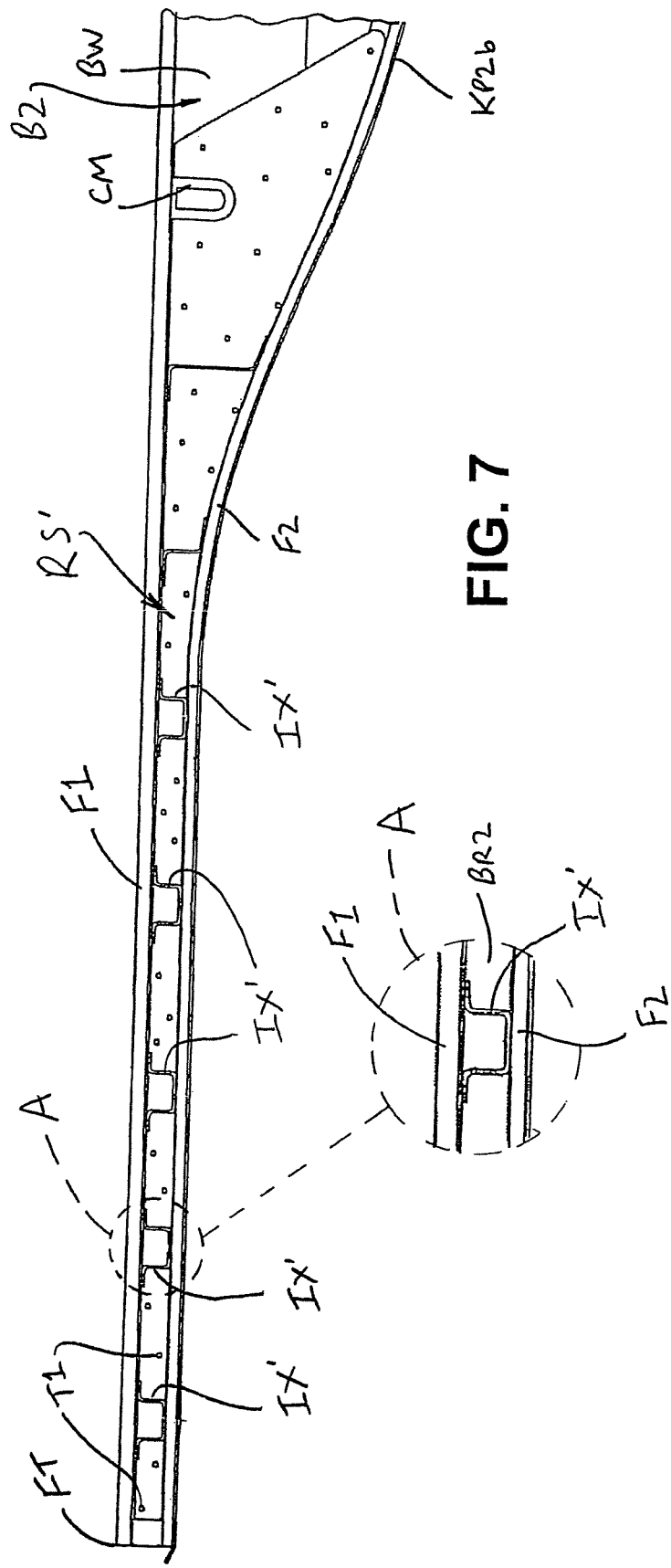
FIG. 7 is similar to FIG. 2D but shows alternative internal cross members that have a hat channel shape instead of a Z-bar shape.

The structure of the reinforced neck N of the trailer TR is shown in FIGS. 2C, 2D, 2E, 2F, 3A, and 3B. Referring to these drawings, the reinforced neck N comprises a reinforcement structure RS comprising a first beam inner reinforcement structure or first beam inner insert I1 connected to an inner region of the first beam B1, and a second beam inner reinforcement structure or second beam inner insert I2 connected to an inner region of the second beam B2 (the inner region of each beam B1,B2 is the portion that faces the other beam B1,B2). The first and second beam inner inserts I1,I2 are arranged in spaced-apart facing relation with respect to each other. The neck reinforcement structure RS further comprises at least one and preferably a plurality of internal cross members IX that extend between and interconnect the first and second beam inserts I1,I2. As shown, the neck reinforcement structure RS comprises a plurality of internal cross members IX that are arranged perpendicular to the trailer longitudinal axis L and parallel and spaced-apart relative to each other. In the illustrated embodiment, at least some of the internal cross members IX are Z bar members that have a z-shaped cross-sectional profile, i.e., a vertical central web IZ3 with upper and lower flanges IZ1,IZ2 that extend outwardly from the web in opposite directions. FIG. 7 is similar to FIG. 2D but shows an alternative embodiment of a neck reinforcement structure RS' in which the internal cross members IX' have a hat channel shape instead of a Z-bar shape (see detail "A") and are arranged with the closed side of the hat channel oriented toward the fifth wheel plate KP.

Figure 3A:
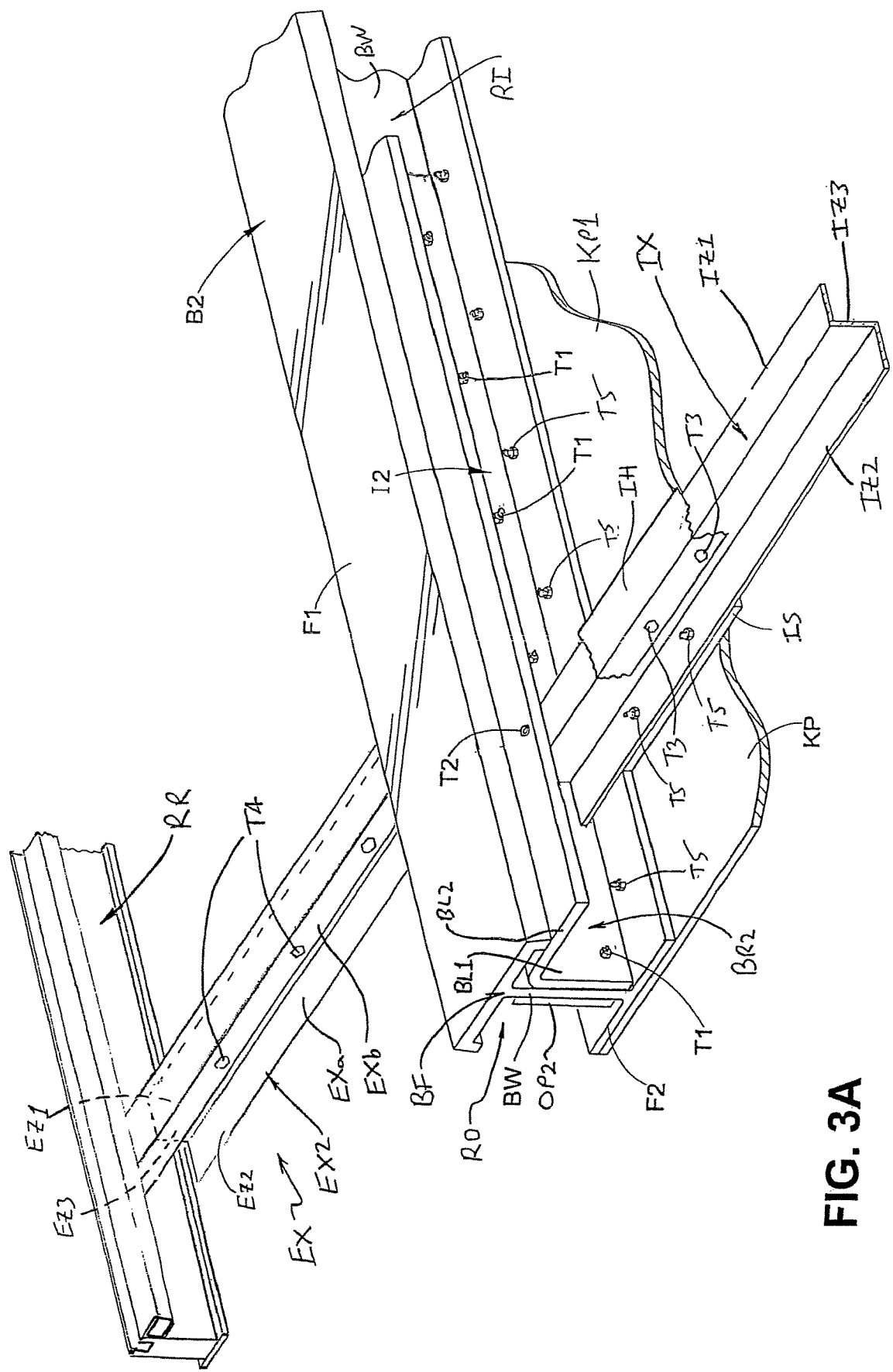
FIG. 3A is an isometric view of a right portion of the reinforced neck structure of a trailer formed in accordance with the present development (the platform members are not shown)
Figure 3B:
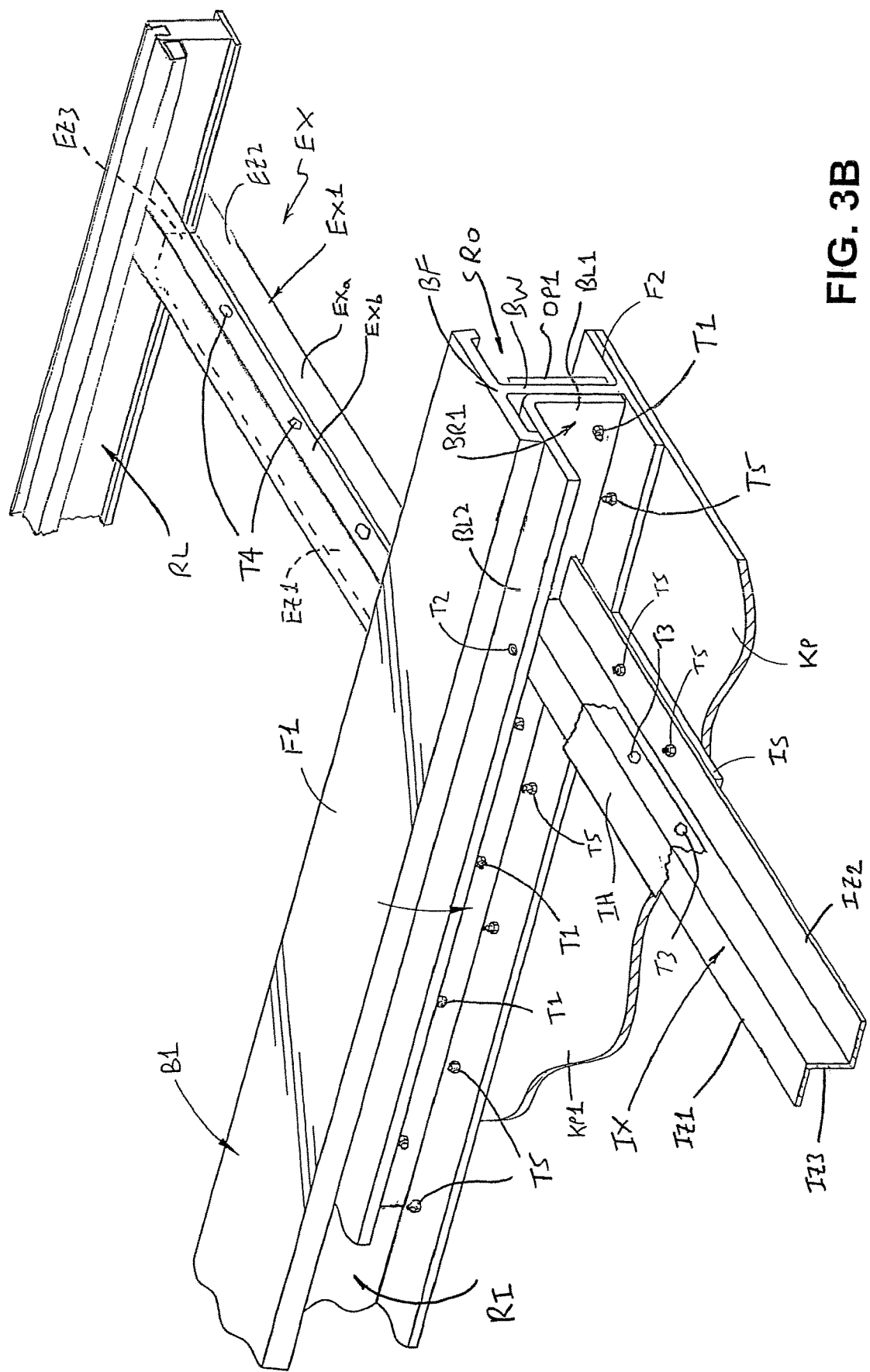
FIG. 3B is an isometric view of a left portion of the reinforced neck structure of a trailer formed in accordance with the present development (the platform members are not shown)

The neck reinforcement structure RS also comprises a plurality of external cross members EX including a first group of external cross members EX1 that extend between and interconnect the first main beam B1 and the left side rail RL and a second group of external cross members EX2 that extend between and interconnect the second main beam B2 and the right side rail RR. In the present example, the external cross members EX are arranged perpendicular relative to the trailer longitudinal axis L, and are arranged parallel and spaced-apart relative to each other. In the illustrated embodiment, at least some of the external cross members EX are also Z bar members as described above and shown herein. FIGS. 3A & 3B are isometric views that respectively show the right and left portions of the reinforced neck structure RS. FIGS. 3A & 3B show only one each of the internal cross member IX and external cross member EX, but those of ordinary skill in the art will recognize that the internal and external cross members IX,EX not shown have a corresponding structure to the illustrated cross members IX,EX. FIGS. 3A & 3B also do not show the platform members PK of the trailer TR in order to reveal the internal and external cross members IX,EX.

The neck reinforcement structure RS further comprises a specialized fifth-wheel plate KP that is connected to and that extends between the lower flanges F2 of the first and second main beams B1,B2. The fifth-wheel plate KP is also described in further detail below.

Figure 2C:
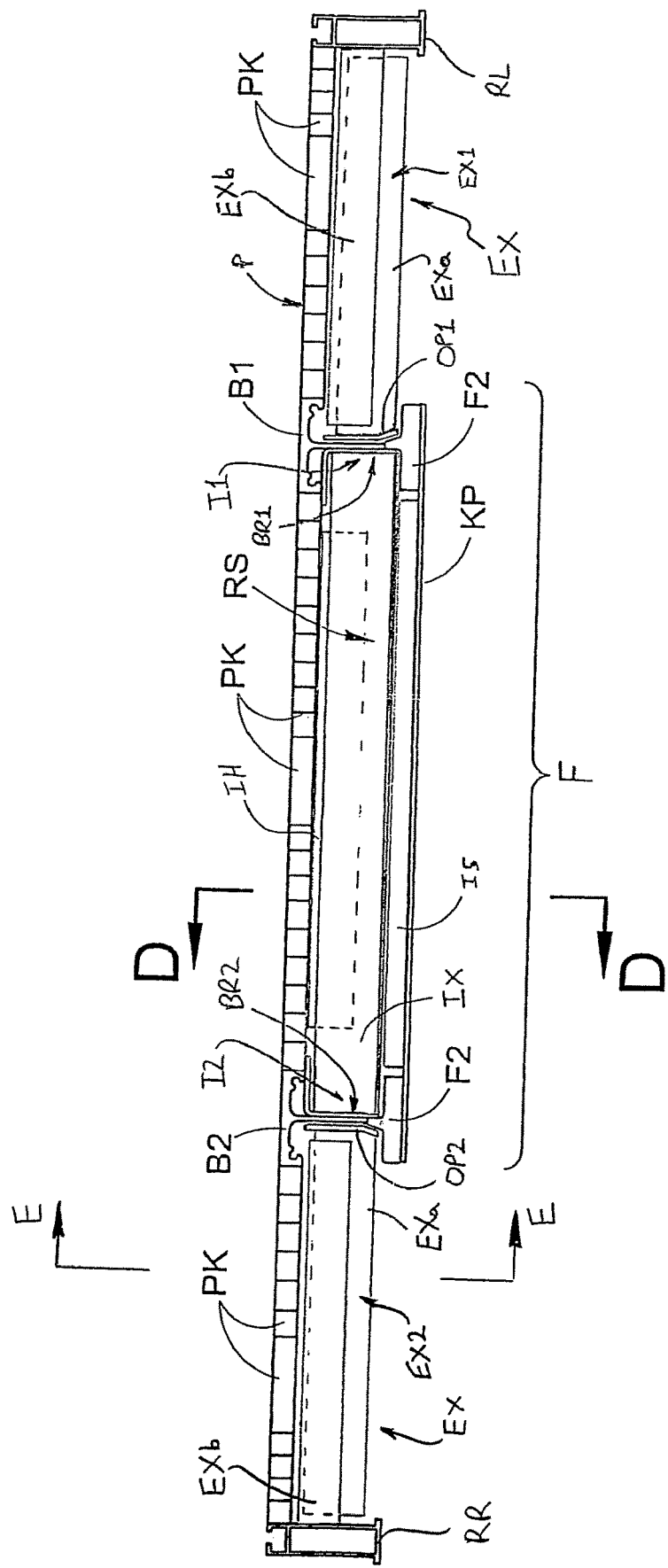
FIG. 2C is a simplified section view taken at line C-C of FIG. 1A.
Figure 2F:
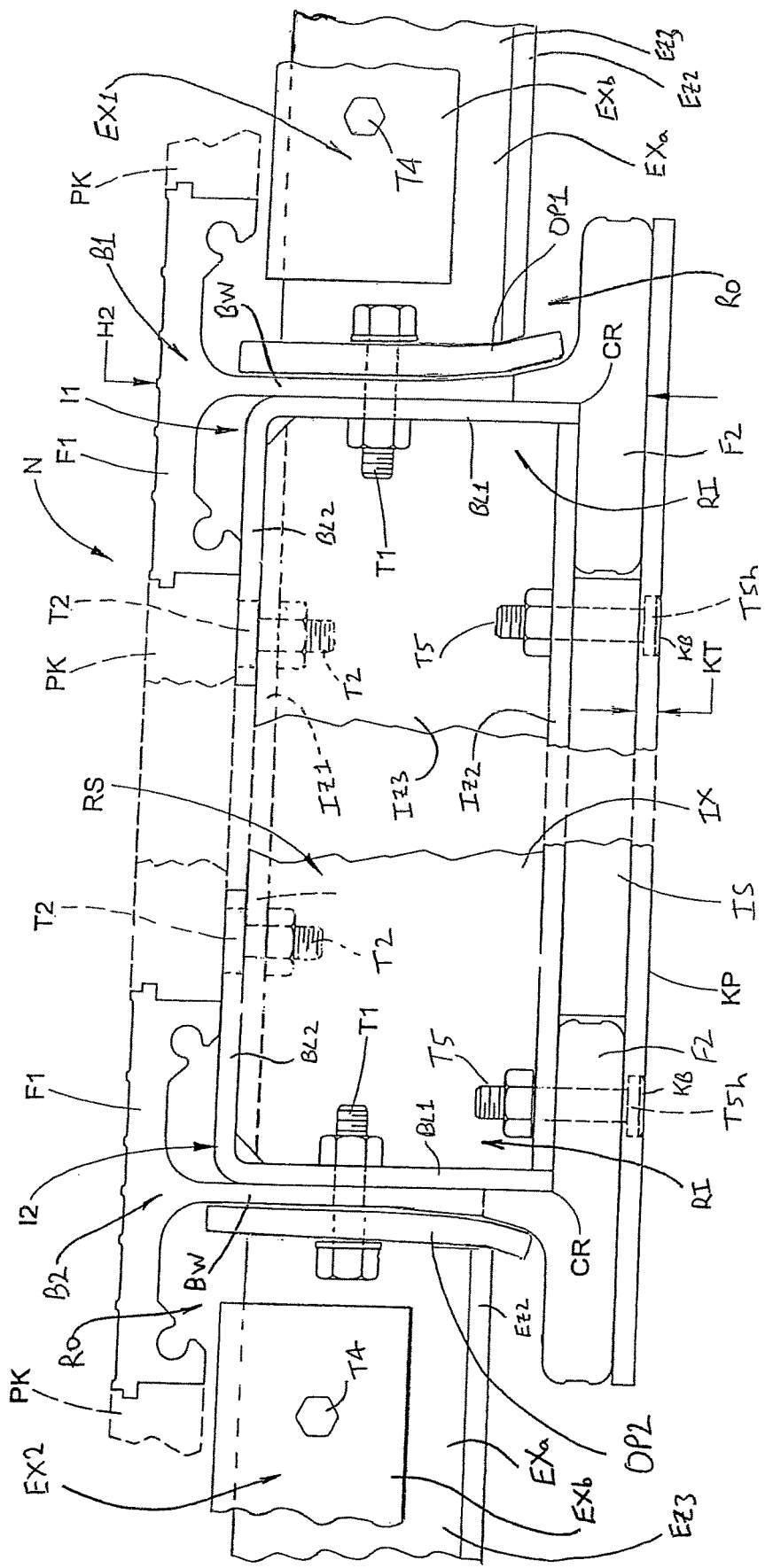
FIG. 2F is an enlarged view of portion F of FIG. 2C.

As noted, the first and second beam inner inserts I1,I2 are respectively connected to the inner regions of the first and second beams B1,B2, wherein the inner region is the portion of the beam B1,B2 that is facing inwardly toward the other beam B1,B2. Referring to FIGS. 2F, 3A & 3B, it can be seen that the inner region of each beam B1,B2 comprises a C-shaped inner recess RI defined between the web BW and the upper and lower flanges F1,F2 on the inner side of the beam B1,B2 that faces the other beam B1,B2. In the illustrated embodiment, the inner recess RI preferably comprises a lower corner CR defined at the intersection of the lower flange F2 and the web BW, and this lower corner CR defines at least substantially a 90 degree or right angle.

The first and second beam inner inserts I1,I2 comprise respective braces BR1,BR2. The braces BR1,BR2 each comprise a first leg BL1 that extends adjacent and abuts the respective beam web BW and each comprise a second leg BL2 that is connected to and that extends perpendicularly outward from the first leg BL1 out of the recess RI beyond the edge of the upper flange F1 toward the other beam B1,B2. The first leg BL1 of each brace is preferably seated in the lower corner CR of the respective beam B1,B2. The second leg BL2 preferably contacts at least part of the upper flange F1 as shown so that the brace BR1,BR2 fits between the beam flanges F1,F2 with minimal clearance. The braces BR1,BR2 each extend longitudinally rearward from a front end located adjacent the front end BF of the beams B1,B2 at the front FT of the trailer TR to a rear end that is located at a place where the beam height H is greater than the second (neck) height H2 but less than the first (maximum) height H1. The braces BR1,BR2 are preferably mirror images of each other and preferably are each provided as a one-piece angle member comprising the first and second legs BL1, BL2, but they can be fabricated from two or more pieces that are welded or otherwise connected together.

For each inner beam insert I1,I2, a plurality of first fasteners such as bolts T1 extend through the beam web BW and the first leg BL1 of each brace BR1,BR2 and are used to connect the first leg BL1 to the beam web BW to secure the insert I1,I2 in the inner recess RI of its respective beam B1,B2. Only some of the first fasteners T1 are shown in the drawings to simplify the views, but they preferably are located at spaced intervals along the full axial length of each brace BR1,BR2.

As noted above, the neck reinforcement structure RS also comprises a plurality of internal cross members IX. These internal cross members XB are arranged perpendicularly or otherwise transverse to the first and second beams B1,B2 and are spaced axially from each other. Each of the internal cross members IX extends between and interconnects the first and second braces BR1,BR2. At least some of the internal cross members IX are shaped and dimensioned to fit closely and with minimal clearance between the lower flange F2 of each beam B1,B2 and the second leg BL2 of the braces BR1,BR2 as shown in FIGS. 2D, 2F, 3A, & 3B. In the illustrated example, the first end of each internal cross member IX is abutted with and connected to the brace BR1 of the first beam insert I1, and the opposite second end of each internal cross member IX is abutted with and connected to the brace BR2 of the second beam insert I2. More particularly, a first end of each internal cross member IX is abutted against and welded to the first leg BL1 of the first brace BR1, and the opposite second end of each internal cross member IX is abutted against and welded to the first leg BL1 of the second brace BR2. Each internal cross member IX is preferably also mechanically fastened at its opposite first and second ends to the first and second braces BR1,BR2, respectively, using bolts or other second fasteners T2 as shown in FIGS. 2F, 3A, & 3B. The heads T2 of the second fasteners T2 are preferably countersunk into the second leg BL2 of the brace BR1,BR2 so as not to interfere with the placement of the platform members PK. In the illustrated embodiment, at least some of the internal cross members IX are Z bar members that have a z-shaped cross-sectional profile including a first (upper) leg IZ1, and a second (lower) leg IZ2 that project in opposite directions from a central vertical support IZ3.

As noted, the trailer beams B1,B2, the conventional cross members CM, the left and right side rails RL,RR, and at least some of the trailer platform members PK are defined from aluminum alloy, typically as extrusions of 6061-T6 or similar. Except as otherwise noted herein, the components of the neck reinforcement structure RS are preferably defined from steel, most preferably stainless steel such as 304 stainless steel or another suitable stainless steel. This allows the opposite ends of the stainless steel internal cross members IX to be welded to the stainless steel braces BR1,BR2, which are secured to the aluminum beams B1,B2 by the first fasteners T1. In order to allow the aluminum trailer platform members PK to be welded to the internal cross members IX, the internal cross members IX preferably comprise an aluminum angle or other aluminum header IH (not shown in FIG. 2F, see FIGS. 3A & 3B) fixedly secured thereto, between the braces BR1,BR2 using bolts or other third fasteners T3 in order to provide an aluminum-to-aluminum interface between the internal cross members IX and the platform members PK for welding.

The neck reinforcement structure RS further comprises first and second outer inserts respectively comprising first and second outer reinforcement plates OP1,OP2, also preferably defined from 304 stainless steel or other stainless steel, or an alternative such as carbon steel. The first outer plate OP1 is secured to the first main beam B1 in abutment with the beam web BW in an outer recess RO defined between the upper and lower beam flanges F1,F2 on the outer side of the beam B1 opposite the internal recess RI. The first fasteners T1 used to secure the brace BR1 to the first beam B1 are also used to secure the outer plate OP1 to the first beam B1. Similarly, the second outer plate OP2 is secured to the second main beam B2 in abutment with the beam web BW in an outer recess RO defined between the upper and lower beam flanges F1,F2 on the outer side of the second beam B2 opposite the internal recess RI. The first and second outer inserts OP1,OP2 are located on the outside of the first and second beams B1,B2, respectively, wherein the outside of each beam B1,B2 is located on the side opposite the inside of the same beam and oriented away from the other beam B1,B2. The first fasteners T1 used to secure the second brace BR2 to the second beam B2 are also used to secure the second outer plate OP2 to the second beam B2. The first and second outer plates OP1,OP2 preferably extend axially along the respective beams B1,B2 at least to a location where the beam height H is greater than the second beam height H2 but less than the first beam height H1.

The plurality of external cross members EX are arranged perpendicularly or otherwise transverse to the first and second beams B1,B2 and are spaced axially from each other. The first plurality or first group EX1 of external cross members EX extends between and interconnects the first outer plate OP1 to the left side rail RL, and the second plurality or second group EX2 of external cross members EX extends between and interconnects the second outer plate OP2 to the right side rail RR. The external cross members EX each comprise an inner segment EXa that is connected to the respective outer plate OP1,OP2 and an outer segment EXb that is connected to the respective trailer side rail RL,RR. The inner segment Exa is defined from 304 stainless steel or other stainless steel (or carbon steel) that can be welded to the respective outer plate OP1,OP2, and the outer segment EXb is defined from aluminum such as an aluminum extrusion that can be welded to the aluminum left/right trailer side rail RL,RR. The inner and outer segments Exa,EXb are connected together by at least two bolts or other cross member fasteners T4 or by other means such as by a bi-metal weld connector that facilitates welding of dissimilar metals. More particularly, the inner end of each inner segment EXa of the first group of external cross members EX1 is abutted with the first outer plate OP1 and secured thereto by welding or other means, and an inner end of each inner segment of the second group of external cross members EX2 is abutted with the second outer plate OP2 and secured thereto by welding or other means. In the illustrated embodiment, the inner segments EXa comprise Z bar members that have a z-shaped cross-sectional profile including a first (upper) leg EZ1, and a second (lower) leg EZ2 that project in opposite directions from a central vertical support EZ3. The outer end of each outer segment EXb of the first group of external cross members EX1 is abutted with the left side rail RL of the trailer TR and is secured thereto by welding or other means, and the outer end of each outer segment EXb of the second group of external cross members EX2 is abutted with the right side rail RR of the trailer TR and is secured thereto by welding or other means. The use of segmented external cross members EX1, EX2 allows the inner and outer segments EXa,EXb each to be welded to a weld-compatible metal at one end and to be securely connected together to define a suitable cross member structure. If the external cross members were defined from a single metal, only one end thereof could be welded given that the left and right side rails RL,RR are defined from aluminum alloy and the first and second outer plates OP1,OP2 are defined from steel such as stainless steel.

Figure 4:
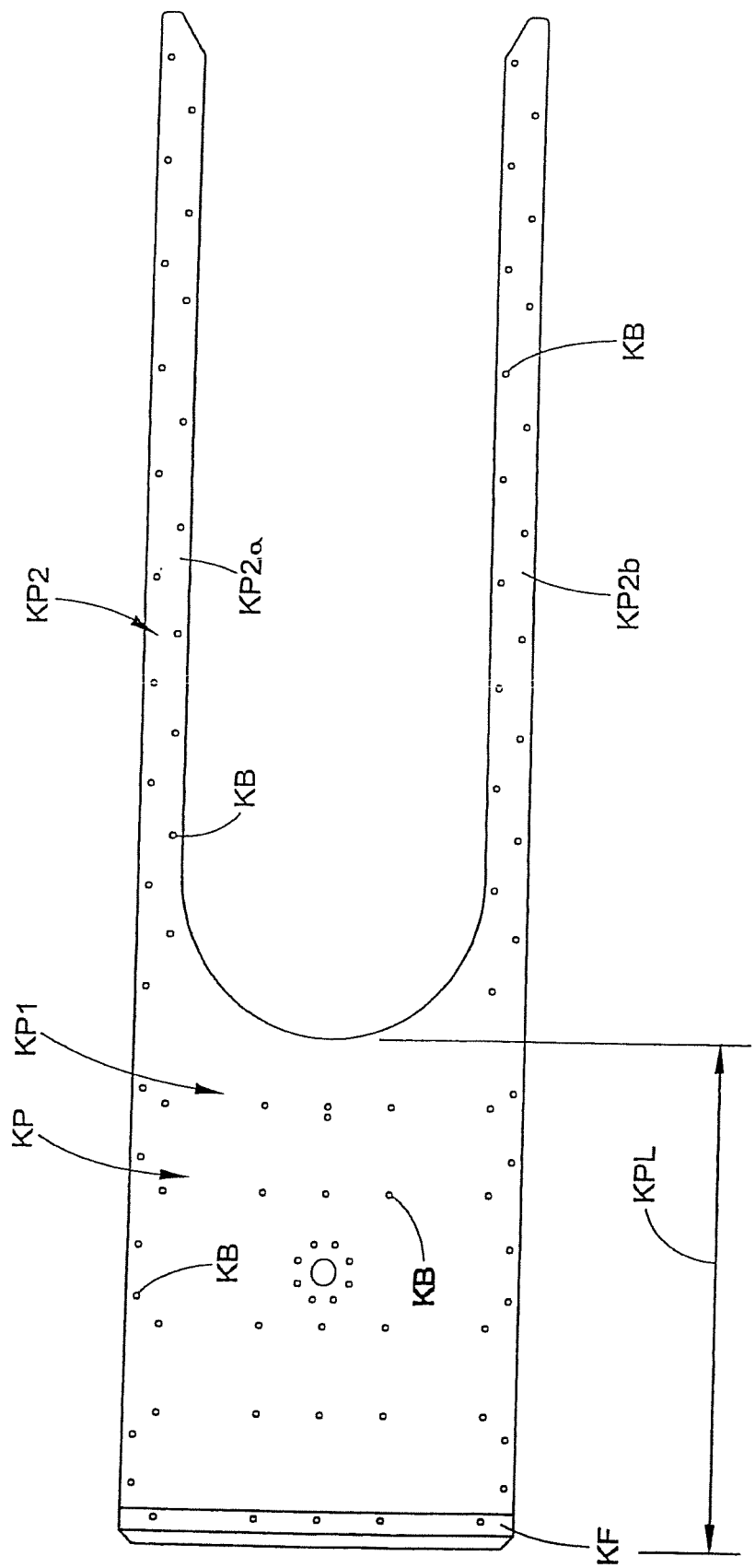
FIG. 4 is a bottom view of the fifth wheel plate used in the reinforced neck structure of the present development.
Figure 5:
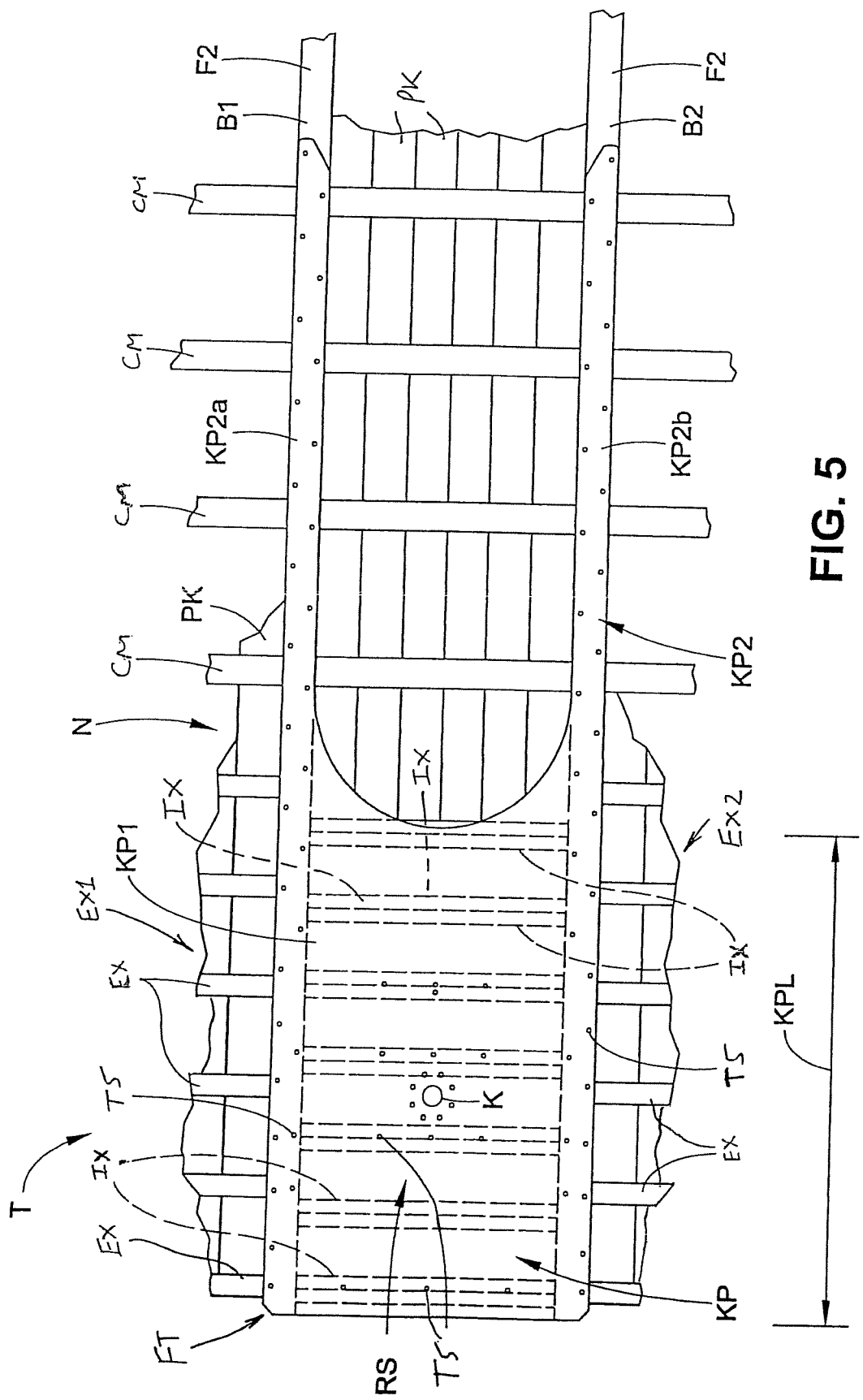
FIG. 5 is a partial bottom view of a trailer including a reinforced neck according to the present development.

As noted above, the neck reinforcement structure RS further comprises a specialized fifth-wheel plate KP. FIG. 4 shows a bottom view of a fifth-wheel plate KP provided in accordance with the present development and suitable for use as part of the neck reinforcement structure RS. FIG. 5 is a bottom view that shows the fifth-wheel plate KP installed as part of the neck reinforcement structure RS. The fifth wheel plate KP comprises a one-piece plate that is bolted or otherwise fixedly secured beneath the lower flanges F2 of the beams B1,B2 at least in the neck region N. The fifth wheel plate KP comprises a one-piece steel (e.g., 1050 steel, ¼ inch), stainless steel (e.g., 304 stainless, ¼ inch), or aluminum alloy plate (e.g., ½ inch) that is bolted or otherwise fixedly secured beneath the lower flanges F2 of the beams B1,B2 at least in the neck region N. The kingpin K is bolted or otherwise secured to the fifth wheel plate KP. The fifth wheel plate comprises a main portion KP1 that begins adjacent the forward edge of the trailer and that extends rearward a distance KPL so as to extend axially rearward beyond the kingpin K. The main portion KP1 extends at least completely between and is connected to both of the beams B1,B2 and is connected to the outer/under side of the beam lower flanges F2. The fifth wheel plate KP further comprises a bifurcated tail portion KP2 including a first tail portion KP2a and a second tail portion KP2b. The first and second tail portions KP2a,KP2b are spaced apart from each other and preferably equal length. The first tail portion KP2a is located adjacent and connected to the outer/under side of the lower flange F2 of the first beam B1, and the second tail portion KP2b is located adjacent and connected to the outer/under side of the lower flange F2 of the second beam B2. The tail portions KP2a,KP2b preferably extend axially rearward beyond the neck portion N to an area where the beams B1,B2 define a height H≥0.75*H1. As shown in FIGS. 2F, 3A, 3B & 5, the fifth wheel plate KP is preferably bolted to the beams B1,B2 using fifth wheel plate fasteners T5 that pass through the fifth wheel plate, the lower beam flange F2, and optionally also through the second leg IZ2 of an internal cross member IX if the fastener T5 is located where it will pass through the second leg IZ2 of an internal cross member. The fasteners T5 comprise heads T5h (FIG. 2F) that are countersunk into counterbores KB defined in the fifth wheel plate KP so as to be flush with the outer (lower) face thereof and not to interfere with the fifth wheel of the tractor that is engaged with the kingpin K.

In the region of the main portion KP1 of the fifth wheel plate that extends between the main beams B1,B2, at least some of the internal cross members IX are bolted, welded or otherwise fixedly secured to the main portion KP1 of the fifth wheel plate using the fifth wheel plate fasteners T5. A plate or box-shaped insert or insert structure IS is bolted, welded or otherwise fixedly secured to the fifth wheel plate main portion KP1 and is located laterally between the lower flanges F2 of the main beams B1,B2. The presence of the insert IS facilitates installation and retention of the fasteners T5 through the fifth-wheel plate KP and internal cross-members IX in the region between the beams B1,B2 without permitting any distortion or other deflection of the fifth-wheel plate KP inward/upward toward the internal cross members IX beyond the lowermost surface of the lower beam flanges F2. In one example, the insert IS is a separate structure that is secured between the fifth-wheel plate KP and an internal cross member IX by the fasteners T5. In another example, the insert IS is first fixedly secured to the fifth-wheel plate KP by welding or using fasteners, and the fasteners T5 are installed later. In another alternative embodiment, the insert IS is connected to the internal cross member IX by welding or fasteners or otherwise, or the insert IS is formed as a one-piece structure as part of the internal cross member IX.

It is preferred that the fifth wheel plate be installed on the beams B1,B2 as described below in more detail in relation to FIGS. 6A & 6B which provide a side view of both beams B1,B2 (the inserts I1,I2 and at least internal cross members IX have been previously installed as described above but are not visible in FIGS. 6A & 6B). To begin the fifth wheel plate installation process, only a forward end KF of the fifth wheel plate KP is secured in its operative position to both the first and second beams B1,B2 adjacent their forward ends BF using some of the fasteners T5 and/or clamps or other means (counter bores KB have previously been formed in the fifth wheel plate KP by plasma cutting or otherwise to accommodate the fastener heads T5h). The beams B1,B2 including the internal cross members IX extending between the braces BR1,BR2, are then (or previously are) subjected to a deflection force PS to urge the forward ends of the beams B1,B2 in the direction of increasing the arch of the pre-arched beams B1,B2, i.e., to tighten the radius or curve of the arch of the pre-arched beams B1,B2. Thus, in the case where the trailer platform P is facing upward, the beams B1,B2 are urged downward at the forward end FT of the trailer. The deflection force is applied in the direction indicated by the arrow PS such that the portion of the beams B1,B2 that will be located at the forward end FT of the trailer TR are deflected downward (both beams B1,B2 simultaneously and uniformly), i.e., the deflection force PS is directed from the upper flange F1 toward the lower flange F2 in the vertical plane of each beam web BW. The beams B1,B2 are deflected by the force PS as shown in broken lines in FIG. 6A. In one preferred embodiment, the beams B1,B2, are provided as pre-arched beams that are manufactured to include an arch and, in such case, the force PS is oriented in the same direction as the beam arch (down on the forward end FT of the trailer TR) so as to tighten the radius of the beam arch for at least the part of the beams B1,B2 where the neck reinforcement structure RS1 is to be installed. While this deflection force PS is applied and maintained, installation of the fifth wheel plate KP is completed by forcing the fifth wheel plate KP into abutment with the lower flanges F2 of the beams B1,B2 moving progressively axially rearward such that the fifth wheel plate KP conforms to the contour of the lower flanges F2, and the previously formed bores KB of the fifth wheel plate KP are used as drill guides for drilling registered bores through the beam lower flanges F2 and through the internal cross members IX and inserts IS for receiving the fasteners T5. With the deflection force PS still present, the fasteners T5 are installed and completely torqued in position. The deflection force PS is removed only after the fasteners T5 are installed and fully torqued and fifth wheel plate KP is fully installed in its operative position. The presence of the installed fifth wheel plate KP prevents the deflected beams B1,B2 from return fully to their undeflected state. As such, the neck reinforcement structure RS is defined as an assembly at least partially held in its deflected state by the fifth wheel plate KP.

Figure 8:
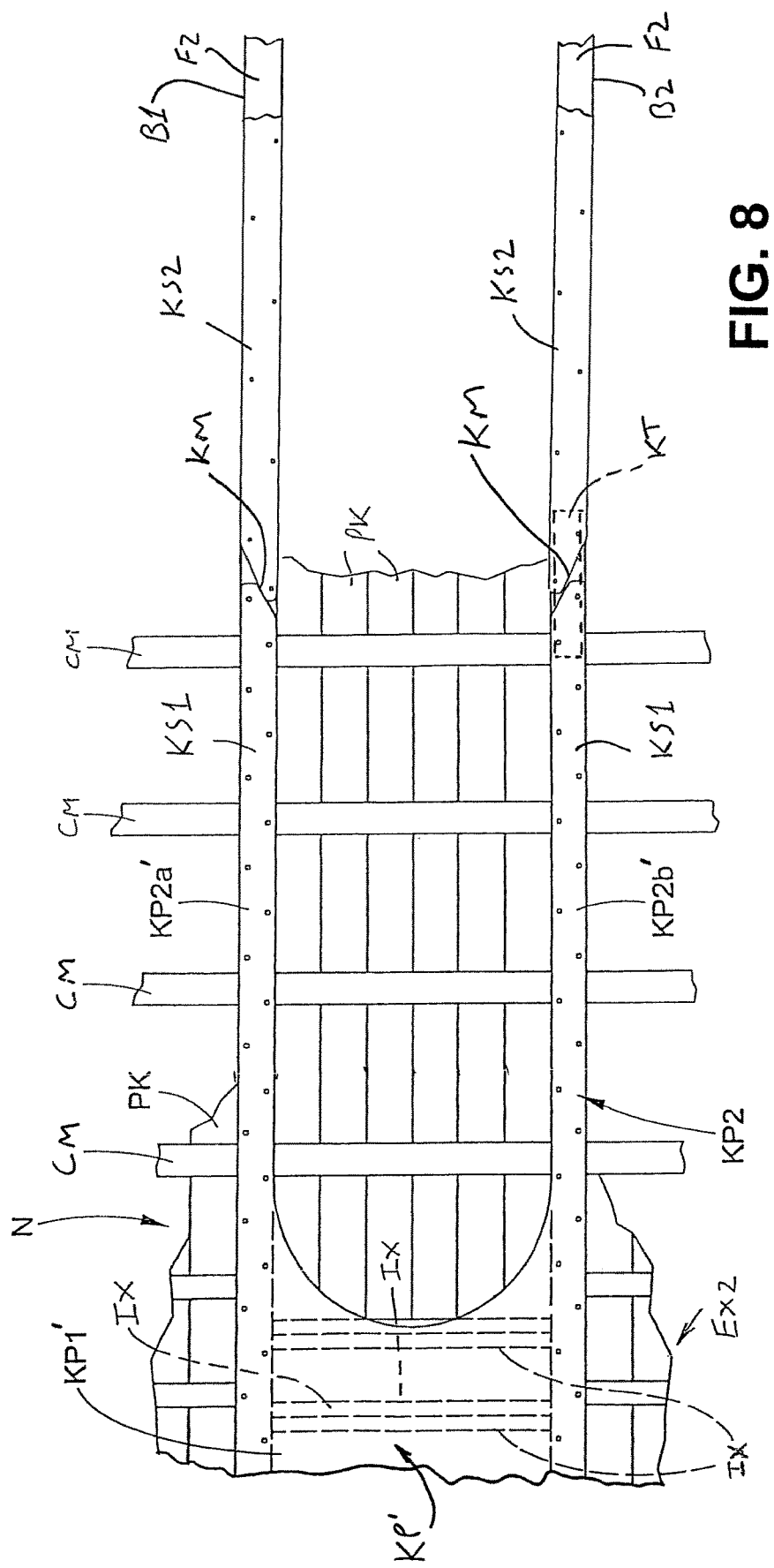
FIG. 8 is similar to FIG. 5, but shows an alternative embodiment in which the fifth wheel plate comprises first and second tail portions that extend rearward beyond a midpoint of the trailer.

FIG. 8 is similar to FIG. 5, but shows an alternative embodiment in which the fifth wheel plate KP' comprises first and second tail portions KP2a',KP2b that extend rearward at least beyond the midpoint of the trailer, preferably rearward to a location adjacent the forward-most axle assembly A. In one embodiment, the entire length of each of the first and second tail portions KP2a',KP2b' is defined as a one-piece construction together with the main portion KP1' of the fifth wheel plate KP'. In an alternative embodiment, as shown in FIG. 8, each of the first and second tail portions KP2a',KP2b' comprises a primary segment KS1 defined as part of a one-piece construction with the main portion KP1' and a separately defined secondary segment KS2 connected to the primary segment KS1 by welding, fasteners and/or other suitable means. In one embodiment, the primary and secondary segments are abutted at a seam KM and welded together. In another embodiment, the primary and secondary segments are abutted at a seam KM and a plate KT (only one plate KT shown in broken lines) is overlapped with both segments KS1,KS2 and the seam KM and is welded and/or fastened to both segments KS1,KS2.

In addition to the reinforcement structure RS1, the neck region N of the trailer T preferably also comprises one or more conventional cross-members CM as shown in FIGS. 2D, 2E & 5. In particular, these conventional cross-members CM extend completely and uninterrupted between and interconnect the left side rail RL and the right side rail RR, while passing through the webs BW of the first and second beams B1,B2 and passing through the first legs BL1 of the braces BR1,BR2 of the first and second beam inserts I1,I2. In the illustrated example, these conventional cross members CM and the outer plates OP1,OP2 are located such that the conventional cross members do not pass through the outer plates OP1,OP2, but the conventional cross members CM and the outer plates OP1,OP2 can alternatively be located such that the conventional cross members also pass through the outer plates OP1,OP2.

In one example, the neck reinforcement structure RS1 or other neck reinforcement structure provided in accordance with the various embodiments disclosed herein is used to provide main beams B1,B2 that define a second height H2 for the beams in the neck region of 5.00 inches. In the example where the thickness KT of the fifth wheel plate KP is 0.25 inches, this would provide an overall height of 5.25 inches (H2+KT=5.25 inches) in the neck region N of the trailer TR. In another example, the neck reinforcement structure RS1 or other neck reinforcement structure provided in accordance with the various embodiments disclosed herein is used to provide main beams B1,B2 that define a second height H2 for the beams in the neck region of 4.75 inches, which provides an overall height of 5.00 inches (H2+KT=5.00 inches) in the neck region N of the trailer TR when the thickness KT of the fifth wheel plate KP is 0.25 inches. In still another example, the neck reinforcement structure RS1 or other neck reinforcement structure provided in accordance with the various embodiments disclosed herein is used to provide main beams B1,B2 that define a second height H2 for the beams in the neck region of 4.50 inches, which provides an overall height of 4.75 inches (H2+KT=4.75 inches) in the neck region N of the trailer TR when the thickness KT of the fifth wheel plate KP is 0.25 inches. For a trailer in which the first height H1≥21, this means that the overall height in the neck region (where "overall height"=H2+KT) is less than or equal to 25% of the first beam height H1. In accordance with all embodiments of the present development, the overall height in the neck region, i.e., H2+KT, is preferably less than or equal to 30% of the first beam height H1, which can be expressed as follows:

$$H2+KT \leq 0.30*H1$$

More preferably, in other embodiments, the overall height in the neck region is less than or equal to 25% of the first beam height H1 as follows:

$$H2+KT \leq 0.25*H1.$$

Of course, this necessarily means that the second beam height H2, itself, without including the thickness of the fifth wheel plate KP, is less than 30% of the first beam height H1 (H2<0.30*H1), and the second beam height H2 is also most preferably less than 25% of the first beam height H1 (H2<0.25*H1) to provide a trailer in accordance with the present development.

The combination of the stainless steel (such as 304 stainless steel) used for the braces BR1,BR2 and other parts of the reinforced neck structure RS with the aluminum alloy (such as 6061-T6) used for the beams B1,B2 has been found to provide an unexpected synergistic effect in terms of the increased strength of the neck reinforcement structure RS during use of the trailer TR. This increased strength is believed to result from the use of dissimilar metals with similar or matched yield strength values, but which exhibit differing physical properties when elastically stressed and elongated. It is believed that the yield strength of the aluminum will be flat or will decrease as it elongates while the yield strength of the 304 stainless steel or other stainless steel will increase during its bending and elongation when stressed such that as the loads on the aluminum beams B1,B2 increase, the stainless steel components of the reinforced neck structure RS1,RS2,RS3 will assume more of these loads and provide the added strength needed to counteract the load stresses and prevent damage to the aluminum beams B1,B2. It is important that the dissimilar metals selected minimize ion exchange that causes corrosion when exposed to an electrolyte such as salt water resulting from salt and other compounds used for deicing roads. Accordingly, the use of stainless steel as described is preferred in order to eliminate or at least reduce galvanic corrosion due to the use of dissimilar metals. In addition, polymeric film, paint, and/or other coatings are installed or applied at the interface between the dissimilar metals in the reinforced neck structure RS to inhibit ion exchange and the associated corrosion. One suitable coating is ECK brand corrosion inhibitor available commercially from Van Nay, LLC, South Elgin, Ill. and described in U.S. Pat. No. 5,744,197.

In all embodiments, the beams B1,B2 can alternatively be aluminum drop deck beams Such drop deck beams can be constructed using various methods such as disclosed in U.S. Pat. No. 5,210,921 entitled "Method of Extruded Aluminum Contoured beam Fabrication" assigned to East Manufacturing Corporation, Randolph, Ohio, the entire disclosure of which is hereby expressly incorporated by referenced into the present specification.

It is intended that the invention be construed as broadly as possible, while maintaining validity, in order to encompass variations, alternatives, modifications, improvements, equivalents, and substantial equivalents of the embodiments and teachings disclosed herein.

The invention claimed is:
1. A platform trailer comprising:
a forward end and a rear end spaced apart from each other along a longitudinal axis;
a cargo supporting platform that extends between said forward end and said rear end and including left and right laterally spaced-apart sides connected respectively to a left side rail and a right side rail;
a chassis supporting said platform, said chassis comprising first and second beams that extend parallel to said longitudinal axis, said first and second beams each comprising a first height H1 located axially between said forward end and said rear end;

at least one axle assembly connected to said chassis and comprising left and right rotatable wheel and tire assemblies;

said forward end of said trailer comprising a neck region where said first and second beams each comprise a second height H2 that is less than said first height H1;

a fifth wheel plate that is fixedly secured to and that extends between both said first and second beams in said neck region;

a kingpin connected to said fifth wheel plate and adapted to be engaged by an associated tractor fifth wheel;

said trailer further comprising a neck reinforcement structure located in said neck region, said neck reinforcement structure comprising:

a first beam reinforcement structure connected to said first beam, said first beam reinforcement structure comprising: (i) a first beam inner insert connected to an inner side of said first beam that faces said second beam; and, (ii) and a first beam outer insert connected to an outer side of said first beam that is oriented away from the second beam;

a second beam reinforcement structure connected to said second beam, said second beam reinforcement structure comprising: (i) a second beam inner insert connected to an inner side of said second beam that faces said first beam; and, (ii) and a second beam outer insert connected to an outer side of said second beam that is oriented away from the first beam;

a plurality of internal cross members that extend between and interconnect said first beam inner insert and said second beam inner insert;

a first group of external cross members located between the first beam outer insert and the left side rail;

a second group of external cross members located between the second beam outer insert and the right side rail;

wherein: (i) each external cross member of said first group and each external cross member of said second group comprises an inner segment connected to an outer segment; (ii) said inner and outer segments of each external cross member of said first group are connected respectively to said first beam outer insert and said left side rail; and (iii) said inner and outer segments of each external cross member of said second group are connected respectively to said second beam outer insert and said right side rail;

and wherein: (i) said first beam inner insert, said first beam outer insert, said second beam inner insert, said second beam outer insert, said internal cross members, and each inner segment of both said first and second groups of external cross members are defined from carbon steel or stainless steel; and (ii) said first and second beams, said left and right side rails, and each outer segment of both said first and second groups of external cross members are defined from a metal that is dissimilar with respect to both carbon steel and stainless steel.

2. The platform trailer as set forth in claim 1, wherein said fifth wheel plate comprises:

a main portion that extends between and connects said first and second beams; and, a bifurcated tail portion including spaced-apart first and second tail portions each connected to said main portion, said first tail portion connected to said first beam and said second tail portion connected to said second beam.

3. The platform trailer as set forth in claim 2, wherein said first and second tail portions of said fifth wheel plate each extend axially rearward from said main portion of said fifth wheel plate toward said rear end of said trailer to at least an axial location where said first and second beams define a height that is at least equal to twice said second height H2.

4. The platform trailer as set forth in claim 3, wherein said first beam height H1 equals a maximum beam height defined by said first and second beams.

5. The platform trailer as set forth in claim 4, wherein said first and second tail portions of said fifth wheel plate each extend axially rearward from said main portion of said fifth wheel plate toward said rear end of said trailer to at least an axial location where said first and second beams define said first beam height H1.

6. The platform trailer as set forth in claim 5, wherein said first and second tail portions of said fifth wheel plate each extend axially rearward from said main portion of said fifth wheel plate toward said rear end of said trailer to at least an axial location where said first and second tail portions are located between said at least one axle assembly and a midpoint of said trailer that is located axially halfway between said forward end and said rear end of said trailer.

7. The platform trailer as set forth in claim 6, wherein each of said first and second tail portions comprises a primary segment defined as part of a one-piece construction with said main portion and a secondary segment connected to said primary segment.

8. The platform trailer as set forth in claim 2, wherein said main portion of said fifth wheel plate is connected to at least one of said plurality of internal cross members between said first and second beams by a plurality of fifth wheel plate fasteners.

9. The platform trailer as set forth in claim 1, wherein:

said first beam inner insert and said first beam outer insert are connected to said first beam by a first plurality of primary fasteners that each extend through said first beam inner insert, said first beam, and said first beam outer insert; and, said second beam inner insert and said second beam outer insert are connected to said second beam by a second plurality of primary fasteners that each extend through said second beam inner insert, said second beam, and said second beam outer insert.

10. The platform trailer as set forth in claim 9, wherein said plurality of internal cross members each comprise a first end welded to said first beam inner insert and each comprise a second end welded to said second beam inner insert.

11. The platform trailer as set forth in claim 10, wherein said first and second beams each comprise an I-beam profile and include a upper flange, a lower flange, and a web that extends between said upper and lower flanges;

said first beam inner insert comprises a first brace installed in a first beam recess located on an inner side of said first beam that is oriented toward said second beam;

said second beam inner insert comprises a second brace installed in a second beam recess located on an inner side of said second beam that is oriented toward said first beam;

said first brace comprising a first leg abutted with said web of said first beam and comprising a second leg connected to said first leg and arranged transverse to said first leg and extending outwardly from said first beam recess beyond said upper flange of said first beam, wherein each of said first plurality of primary fasteners extends through said first leg of said first brace, said web of said first beam, and said first beam outer insert;

said second brace comprising a first leg abutted with said web of said second beam and comprising a second leg connected to said first leg and arranged transverse to said first leg and extending outwardly from said second beam recess beyond said upper flange of said second beam, wherein each of said second plurality of primary fasteners extends through said first leg of said second brace, said web of said second beam, and said second beam outer insert.

12. The platform trailer as set forth in claim 11, wherein at least some of said internal cross members are bolted to the respective second legs of both said first and second braces.

13. The platform trailer as set forth in claim 9, wherein:
said inner segment of each of said external cross members of said first group is welded to said first beam outer insert;
said outer segment of each of said external cross members of said first group is welded to said left side rail;
said inner segment of each of said external cross members of said second group is welded to said second beam outer insert;
said outer segment of each of said external cross members of said second group is welded to said right side rail.

14. The platform trailer as set forth in claim 13, wherein said inner and outer segments of each external cross member of said first and second groups of external cross members are connected together by at least two fasteners.

15. The platform trailer as set forth in claim 1, wherein said second beam height H2 is defined at an axial location on said longitudinal axis at which said kingpin is connected to said trailer.

16. The platform trailer as set forth in claim 15, wherein the second beam height H2 is less than 30% of the first beam height H1 such that:

$$H2<0.30*H1.$$

17. The platform trailer as set forth in claim 15, wherein the second beam height H2 is less than 25% of the first beam height H1 such that:

$$H2<0.25*H1.$$

18. The platform trailer as set forth in claim 1, wherein said first and second beams are defined from aluminum alloy.

19. A trailer comprising:
a cargo supporting platform that extends between a forward end and a rear end and including a left side rail and a right side rail;
a chassis that supports said platform, said chassis comprising first and second I-beams that extend parallel to each other and parallel to a longitudinal axis, said first and second beams each comprising a first height H1 located axially between said forward end and said rear end;
at least one axle assembly connected to said chassis and comprising left and right wheel and tire assemblies;
said trailer comprising a neck region where said first and second beams each comprise a second height H2 that is less than said first height H1;
a fifth wheel plate that is fixedly secured to and that extends laterally between both said first and second beams in said neck region;
a kingpin connected to said fifth wheel plate and adapted to be engaged by an associated tractor fifth wheel;
said trailer further comprising a neck reinforcement structure located in said neck region, said neck reinforcement structure comprising:
a first beam reinforcement structure connected to said first beam, said first beam reinforcement structure comprising: (i) a first beam inner insert connected to an inner side of said first beam that faces said second beam; and, (ii) and a first beam outer insert connected to an outer side of said first beam that is oriented away from the second beam;
a second beam reinforcement structure connected to said second beam, said second beam reinforcement structure comprising: (i) a second beam inner insert connected to an inner side of said second beam that faces said first beam; and, (ii) and a second beam outer insert connected to an outer side of said second beam that is oriented away from the first beam;
a plurality of internal cross members that extend between and interconnect said first beam inner insert and said second beam inner insert;
a first group of external cross members located between the first beam outer insert and the left side rail;
a second group of external cross members located between the second beam outer insert and the right side rail;
wherein each external cross member of both of said first and second groups comprises an inner segment made of a first metal connected to an outer segment made of a second metal that is different than the first metal of the inner segment;
wherein:
said first metal comprises carbon steel or stainless steel and said second metal comprises an aluminum alloy;
said inner segment of each external cross member of said first group is welded to said first beam outer insert and said outer segment of each external cross member of said first group is welded to said left side rail; and,
said inner segment of each external cross member of said second group is welded to said second beam outer insert and said outer segment of each external cross member of said second group is welded to said right side rail.

* * * * *